May 30, 1961 W. C. YOCUM 2,986,372
VALVE FOR LOW TEMPERATURE FLUIDS
Filed Oct. 7, 1957

INVENTOR.
WILLIAM C. YOCUM.
BY
*Christy, Parmelee & Strickland*
ATTORNEYS.

United States Patent Office 2,986,372
Patented May 30, 1961

2,986,372

VALVE FOR LOW TEMPERATURE FLUIDS

William C. Yocum, Scott Township, Allegheny County, Pa., assignor to Superior Valve and Fittings Company, Pittsburgh, Pa., a corporation of Pennsylvania Filed Oct. 7, 1957, Ser. No. 688,750

5 Claims. (Cl. 251—214)

This invention relates to valves, and is for a valve especially designed for use where the valve is used to control the flow of very low temperature fluids. It will hereinafter be referred to particularly with respect to liquid oxygen and liquid nitrogen, but it may be used wherever extremely low temperatures are encountered.

Liquid oxygen at atmospheric pressure is normally at a temperature of −297° F. and liquid nitrogen is normally at −320° F. Conventional valves cannot be used because the packing becomes hard and rigid and then fails to form a seal about the valve stem. Therefore valves for this purpose are made with very long stems so that the valve stem packing is removed several inches from the liquid and prevented from becoming rigid by being exposed to the ambient temperatures and surroundings.

It has heretofore been proposed to overcome this difficulty by using a well-known type of packless valve having a flexible diaphragm between the valve operating member and the valve element. For use with extremely low temperatures, two or more diaphragms may be used in face-to-face contact. As long as such a valve remains cold, it may be operated, but in use the valve becomes coated with a thick layer of frost. Then, when the flow of cold fluid is stopped, the frost melts and it is impossible to prevent some of the water or water vapor from getting into the threads of the valve operating stem inside the valve bonnet. Then when the low temperature fluid again flows through the valve, the moisture trapped in the threads solidifies, thereby so firmly locking the valve operating member that it cannot be turned at all. At other times, moisture from other sources, such as exposure to weather, may similarly affect the operation of the valve.

The present invention has for its object to provide a packless valve which cannot become thus frozen. A further object of the invention is to provide a valve bonnet with a plastic seal that excludes moisture from the threads and renders the valve proof against freezing when alternately subjected to extreme cold and thawing temperature.

My invention may be more fully understood by reference to the accompanying drawings, in which.

Figure 1:
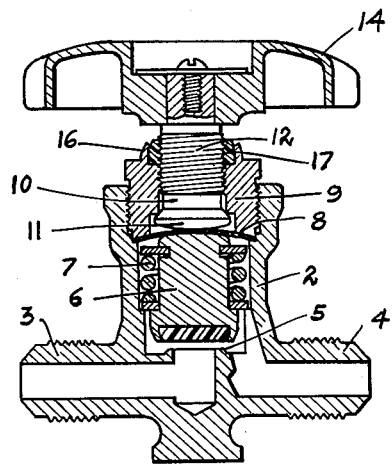
Fig. 1 is a vertical section through the valve.
Figure 2:
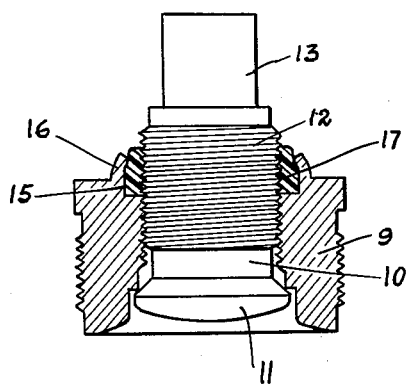
Fig. 2 is a vertical section through a valve bonnet embodying my invention, the bonnet and valve operating member being shown on a larger scale.

In the drawings, 2 designates a valve body with opposed connection nipples 3 and 4. There is a valve seat 5 inside the body. The valve 6 is urged to the open position by a spring 7. A stainless steel diaphragm 8 that remains flexible at extremely low temperatures extends across the upper end of the valve and has its edges clamped between an internal shoulder in the valve body and the lower end of the valve bonnet 9. This bonnet is exteriorly threaded to screw into the valve body which is interiorly threaded. The valve operating member 10 has a lower portion 11 bearing on the diaphragm and a threaded shank 12 screwed into the bonnet. The upper end 13 thereof has a hand wheel 14.

So much of the construction is usual in packless valves. According to a present preferred form of my invention, the top of the bonnet is recessed around the central passage as indicated at 15, and provided with an upstanding flange 16 forming a continuation of the side wall of the recess. Into this recess is set an annulus or washer-like body 17 of a plastic that does not become brittle at a temperature to which the valve is exposed, but is plasticized to retain some resilience or yieldable quality at very low temperatures, such as tetrafluoroethylene resin sold commercially under the trademark "Teflon." This ring or annulus has an internal diameter about equal to the root diameter of the threaded shank 12 of the valve operating stem or the minimum diameter of the internally threaded opening through the bonnet. After the plastic annulus has been set into the recess, the top of the flange 16 is swedged inwardly to immovably retain the plastic ring in place and compact it into the cavity.

When the bonnet has been thus assembled the valve operating stem is screwed into the bonnet, being entered from the bottom of the bonnet so that it first engages the threads in the metal bonnet. As the stem continues to be screwed into the bonnet, the top of the threaded shank will engage the plastic ring and form threads or thread-like grooves and ridges in situ in the plastic. Thus the threads will conform exactly to those of the stem and because of the inherent pliability of the plastic and its hydrophobic or non-wetting properties, it will provide a moisture-tight seal about the threads at the upper end of the valve operating stem. Since the plastic itself is tightly compacted in the recess, moisture cannot travel around the outside of the plastic collar down into the recess and from there into the metal-to-metal threads.

It has been found that this structure enables a diaphragm valve to be used for liquified gases and in any application where extremely low temperatures are encountered and where the valve may be subject to freezing and thawing of moisture accumulated over the valve, and the valve operating member protected from being locked by frozen moisture in the threads.

I have shown one arrangement for holding the collar or ring 17 in the bonnet, but it will be understood that this may be secured in various ways so long as the plastic collar is tightly fitted in its recess and water above the collar is not retained above the plastic. It will be noted in the construction shown that the plastic collar projects above the top of the retaining flange on the bonnet, whereas if the flange 16 extended above the plastic, a recess would be formed in which water could be retained around the threaded upper end of the valve operating stem, a condition which should be avoided.

I have here shown a valve with a short operating stem, but in some cases where the valve stem is longer so that there is a longer unthreaded shank between the threads and the end 13, the packing ring will engage only the unthreaded shank. It should be kept in mind, however, that the packing ring is disposed to protect the threads on the valve stem from moisture entering the threads from the exterior and does not operate to confine the gases against leakage, this being accomplished by the diaphragm.

As a result of my invention it is practical to use small, compact diaphragm sealed valves under conditions where low temperatures have heretofore rendered the utility or dependability of such valves questionable.

I claim:

1. A bonnet and stem assembly for diaphragm packless valves, said assembly comprising a metal bonnet having a threaded inner end for attachment to the body of a diaphragm sealed packless valve and an outer end, the bonnet having a bore extending axially therethrough from one end to the other, said bore being internally threaded intermediate its ends, a metal operating stem extending through the bore of the bonnet having one end projecting beyond the outer end of the bonnet and having means at its inner end for contacting the diaphragm seal in the valve body to which the bonnet is secured, the operating stem having threads thereon engaging the internal threads of the bore through the bonnet, and a hydrophobic resinous annulus surrounding the operating stem and exposed at the outer end of the bonnet for excluding water from any areas of contact between the metal bonnet and the metal operating stem.

2. A bonnet and stem assembly for diaphragm packless valves, said assembly comprising a metal bonnet having a threaded inner end for attachment to the body of a diaphragm sealed packless valve and an outer end, the bonnet having a bore extending axially therethrough from one end to the other, said bore being internally threaded intermediate its ends, a metal operating stem extending through the bore of the bonnet having one end projecting beyond the outer end of the bonnet and having means at its inner end for contacting the diaphragm seal in the valve body to which the bonnet is secured, the operating stem having threads thereon engaging the internal threads of the bore through the bonnet, and a hydrophobic resinous annulus surrounding the operating stem and exposed at the outer end of the bonnet positioned to prevent accumulation of water around the operating stem beyond the bonnet and avoid entrance of water from the exterior of the valve bonnet and stem into any areas of contact between the metal bonnet and the metal operating stem.

3. A bonnet and stem assembly for diaphragm packless valves, said assembly comprising a metal bonnet having a threaded inner end for attachment to the body of a diaphragm sealed packless valve and an outer end, the bonnet having a bore extending axially therethrough from one end to the other, said bore being internally threaded intermediate its ends, a metal operating stem extending through the bore of the bonnet having one end projecting beyond the outer end of the bonnet and having means at its inner end for contacting the diaphragm seal in the valve body to which the bonnet is secured, the operating stem having threads thereon engaging the internal threads of the bore through the bonnet, and a hydrophobic resinous annulus surrounding the operating stem exposed at the outer end of the bonnet and projecting beyond any metallic part of the bonnet and shaped to prevent the accumulation of water around the operating stem externally of the bonnet.

4. A bonnet and stem assembly for diaphragm packless valves, said assembly comprising a metal bonnet having a threaded inner end for attachment to the body of a diaphragm sealed packless valve and an outer end, the bonnet having a bore extending axially therethrough from one end to the other, said bore being internally threaded intermediate its ends, a metal operating stem extending through the bore of the bonnet having one end projecting beyond the outer end of the bonnet and having means at its inner end for contacting the diaphragm seal in the valve body to which the bonnet is secured, the operating stem having threads thereon engaging the internal threads of the bore through the bonnet, the outer end of the bonnet having a recess therein, an annulus of water-repellent material in the recess fitted around the operating stem, the annulus projecting beyond the end of the bonnet and being exposed at its outer end, and means on the bonnet for retaining the resinous annulus in the recess and positioned entirely inwardly of the exposed end of the annulus.

5. A bonnet and stem assembly for a diaphragm packless valve as defined in claim 4 in which the annulus of water-repellent resinous material has threads formed in situ therein about the threads on the operating stem.

References Cited in the file of this patent

UNITED STATES PATENTS

| 659,336 | Booth | Oct. 9, 1900 |
| 1,169,309 | Wagner | Jan. 25, 1916 |
| 1,890,505 | Forbes | Dec. 13, 1932 |
| 2,370,245 | Jacobson et al. | Feb. 27, 1945 |
| 2,447,510 | Langdon | Aug. 24, 1948 |
| 2,450,694 | Sauer | Oct. 5, 1948 |
| 2,477,429 | Swangstrom et al. | July 26, 1949 |
| 2,596,681 | Hammon | May 13, 1952 |
| 2,630,290 | Courtot | Mar. 3, 1953 |
| 2,646,245 | Bedini | July 21, 1953 |
| 2,699,479 | Gorham | Jan. 11, 1955 |
| 2,721,749 | Crow | Oct. 25, 1955 |
| 2,749,079 | Desjarlais | June 5, 1956 |

FOREIGN PATENTS

| 160,192 | Australia | Dec. 9, 1954 |

OTHER REFERENCES

"Teflon," Plastics Magazine; July 1946 Ziff. Davis Publishing Company, Chicago, Illinois.

Product Engineering Bulletin, No. 1, 1955, E. S. du Pont de Nemours & Co.; The Polychemicals Dept., Wilmington, Del.